UNITED STATES PATENT OFFICE.

EDWARD WRAY, OF BIEBRICH, GERMANY, ASSIGNOR TO THE FIRM OF KALLE AND COMPANY, AKTIENGESELLSCHAFT, OF BIEBRICH, GERMANY.

MANUFACTURE OF BLACK VAT DYESTUFFS.

1,157,485.  Specification of Letters Patent.  Patented Oct. 19, 1915.

No Drawing.  Application filed July 17, 1913. Serial No. 779,636.

*To all whom it may concern:*

Be it known that I, EDWARD WRAY, chemist, and a subject of the King of England, residing at 2 Kaiserstrasse, Biebrich-on-the-Rhine, Germany, have invented certain new and useful Improvements in the Manufacture of Black Vat Dyestuffs, of which the following is a specification.

In the specification of German Letters Patent No. 241997 is described the production of black vat dye-stuffs from pheno-oxy-naphtho-carbazole, derived from alpha-naphthyl-amin and isatin-alpha-derivatives. Among others a coloring matter is mentioned which is formed by the action of di-bromo-isatin-anilid on 1.2-pheno-5-oxy-naphtho-carbazole.

I have now found that a dye-stuff of a similar tint but of greater fastness can be obtained in a much simpler manner by condensing pheno-oxy-naphtho-carbazole with the reactive alpha-derivatives of the mono-chloro-isatin, especially the para-chloro-isatin-alpha-para-chloro-anilid of the following formula

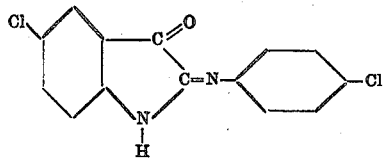

These dyestuffs have the following graphically represented formula, in which R stands for a mono-chlor-isatin radical:

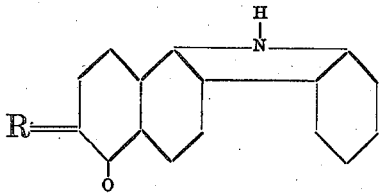

The production of this dye-stuff is technically more advantageous because the para-chloro-isatin-alpha-para-chloro-anilid can be more easily produced than the di-bromo-isatin-alpha-anilid. Furthermore the dye-stuff possesses in reduced state a greater solubility giving a clear vat, whereas the dyestuff obtained from di-bromo-isatin-alpha-anilid gives under the same conditions a more difficultly soluble leuco-compound.

It was not to have been expected that the dye-stuff obtained according to the present invention, which contains only one chlorin-atom, would possess more valuable properties than the dye-stuff described in German Letters Patent No. 241997 which contains two bromin-atoms.

In order to illustrate the process more fully I can proceed as follows, the parts being by weight: 14 parts of para-chloro-isatin-alpha-para-chloro-anilid, 6 parts of 5-oxy-2.1-naphtho-carbazole and 70 parts of acetin-anhydrid are boiled together until the formation of the dye-stuff is complete. After cooling to about 70° centigrade the condensation product which has separated out is filtered and washed with hot glacial acetic acid and alcohol. The new coloring matter has the following formula

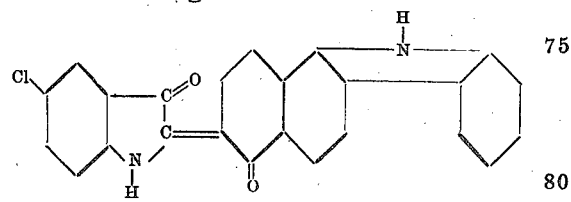

and, when dry, is a black powder which is insoluble in water and alcohol, soluble in hot nitro-benzene and quinolin with a blue color and in cold sulfuric acid with a slate-blue color. It yields on treatment with hydrosulfite and alkali a clear yellow vat from which cotton is dyed yellow changing on exposure to air into a fast black.

I claim:

1. A process for producing black vat dye-stuffs which consists in condensing mono-chloro-isatin-alpha-derivatives with pheno-oxy-naphtho-carbazole of the following formula,

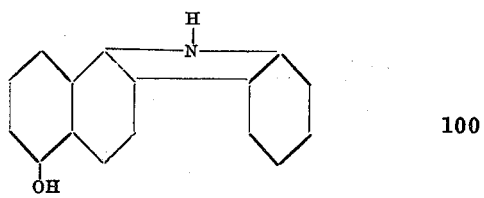

2. A process for producing black vat dyestuffs which consists in condensing para-chloro-isatin-alpha-para-chloro-anilid with pheno-oxy-naphtho-carbazole of the following formula,

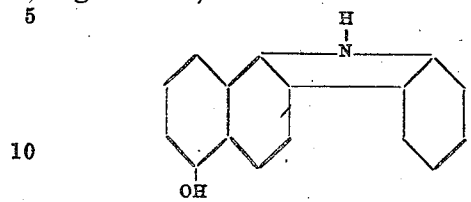

3. A process for producing black vat dye-stuffs which consists in heating mono-chloro-isatin-alpha derivatives with pheno-oxy-naphtho-carbazole of the following formula:

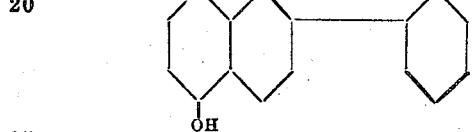

in the presence of acetic anhydrid.

4. A process for producing black vat dye-stuffs which consists in heating in the presence of acetic anhydrid, mono-chloro-isatin-alpha-para-chloro-analid with pheno-oxy-naphtho-carbazole, of the following formula:

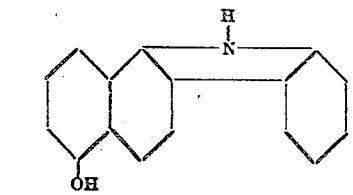

5. As new products black vat dye-stuffs obtainable by combining mono-chloro-isatin-alpha-derivatives with a pheno-oxy-naphtho-carbazole derived from alpha-naphthyl-amin, said products having the following graphically represented formula:

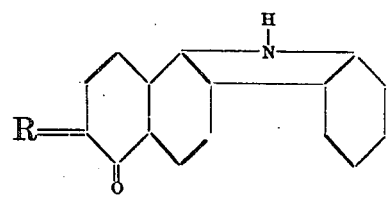

in which formula R stands for a monochlor-isatin radical.

6. As a new product 5-chloro-2-indol-6-phenyl-alpha-naphthylcarbazolindigo of the following formula:

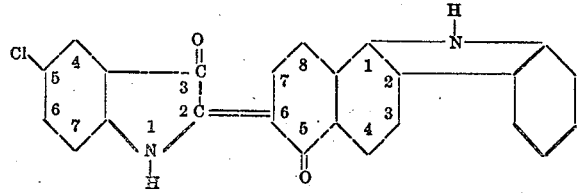

being a black powder in dry state, insoluble in water and alcohol, soluble in hot nitro-benzene and quinolin with a blue, in cold sulfuric acid with a slate-blue color, forming when reduced with alkaline reducing agents a clear yellow vat from which the textile fiber is dyed in fast black shades.

In testimony whereof I have signed my name to this specification in the presence of two subscribing witnesses.

EDWARD WRAY.

Witnesses:
 MORITZ WEZEL,
 MINNA RITZSL.